J. V. R. SHEPHERD.
BAG MAKING MACHINE.
APPLICATION FILED MAR. 26, 1920.

1,365,495.

Patented Jan. 11, 1921.
8 SHEETS—SHEET 1.

Inventor:
Joe V. R. Shepherd
by Robt. P. Harris.
Attorney

J. V. R. SHEPHERD.
BAG MAKING MACHINE.
APPLICATION FILED MAR. 26, 1920.
1,365,495.
Patented Jan. 11, 1921.
8 SHEETS—SHEET 2.
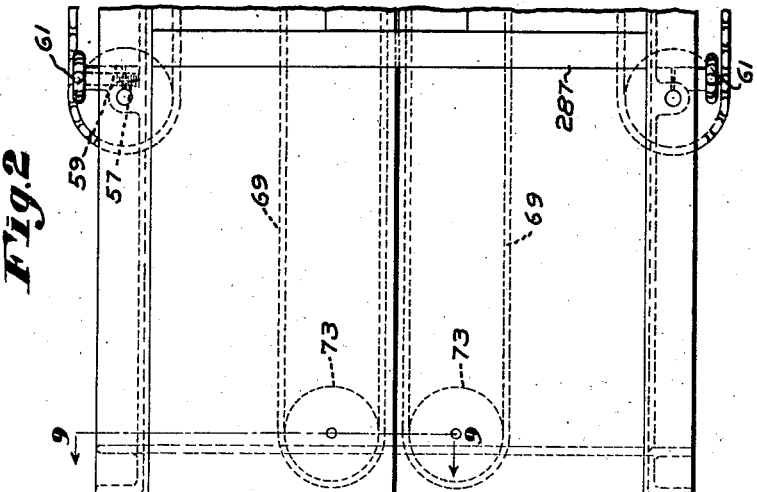
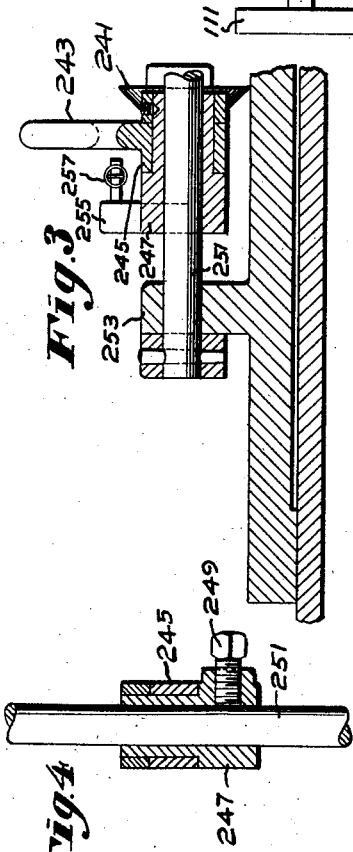
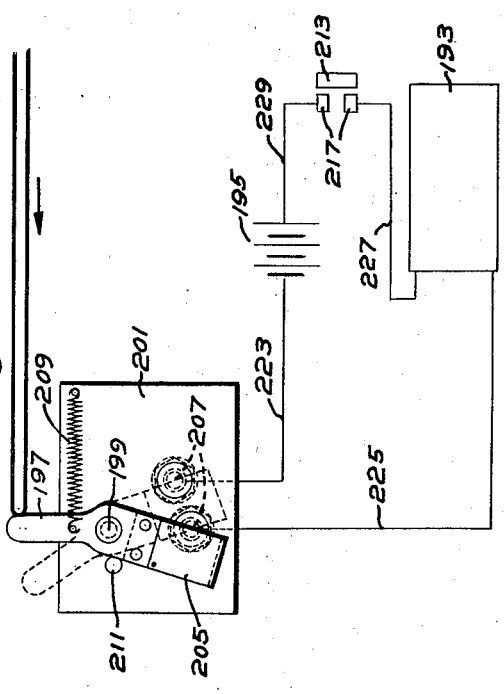
Inventor:
Jos. V. R. Shepherd
by Robt. O. Nairn.
Attorney

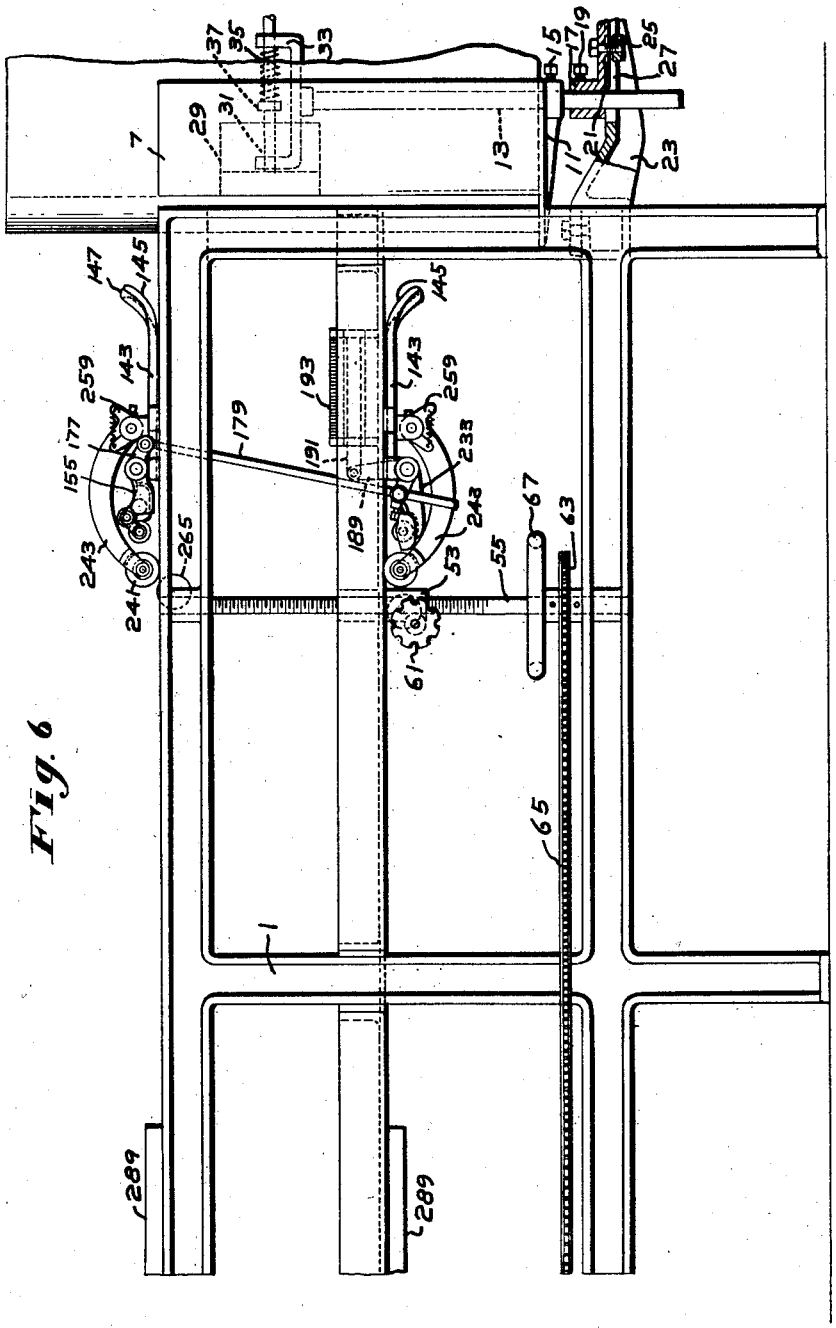

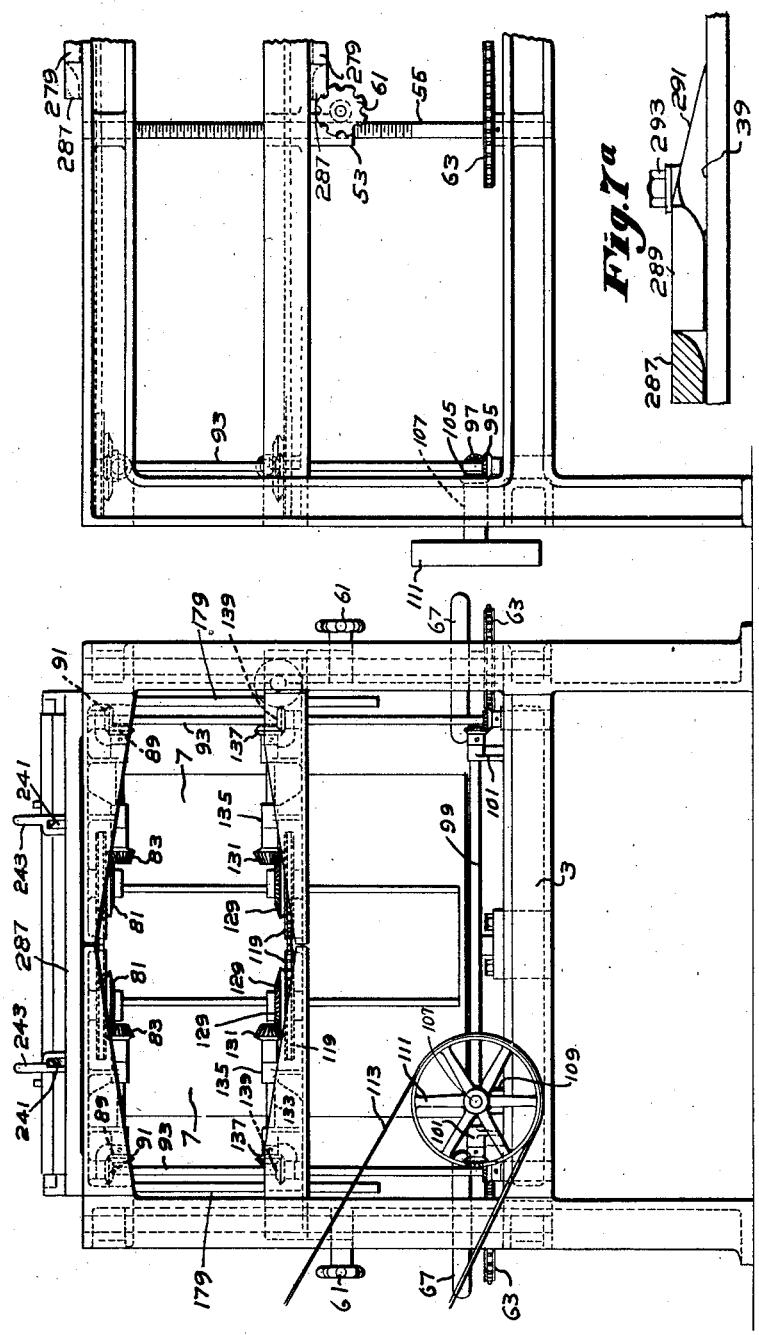

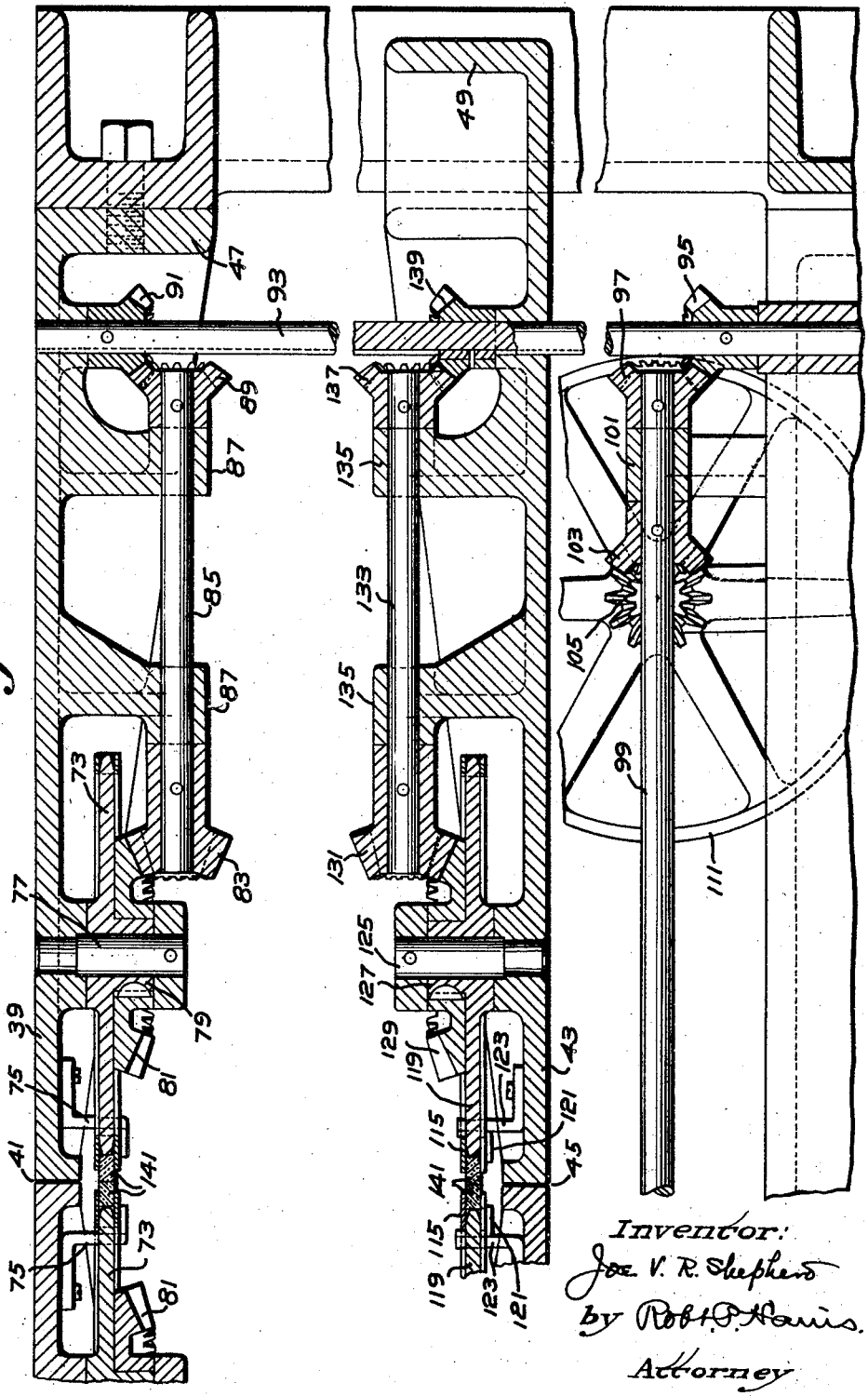

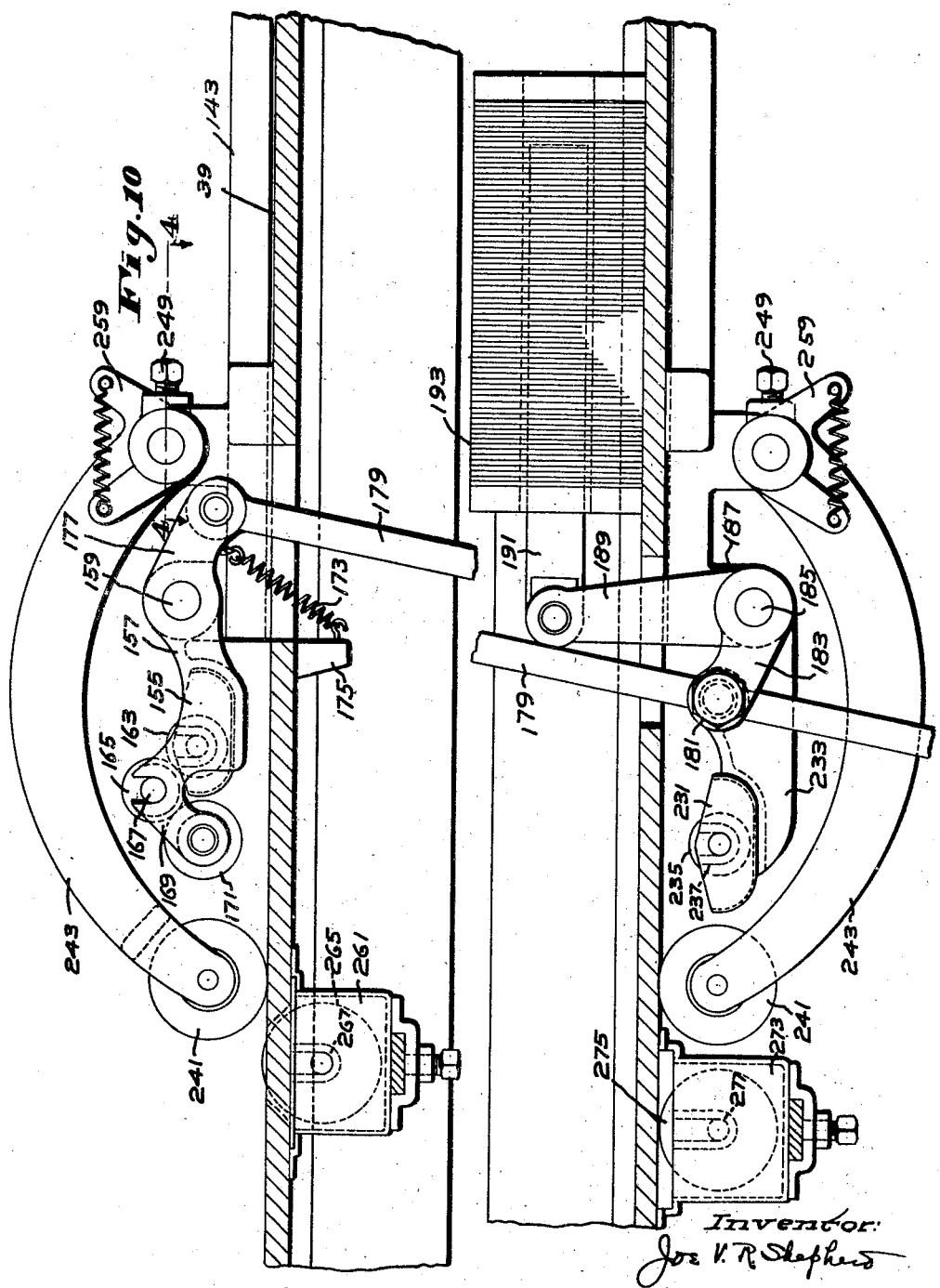

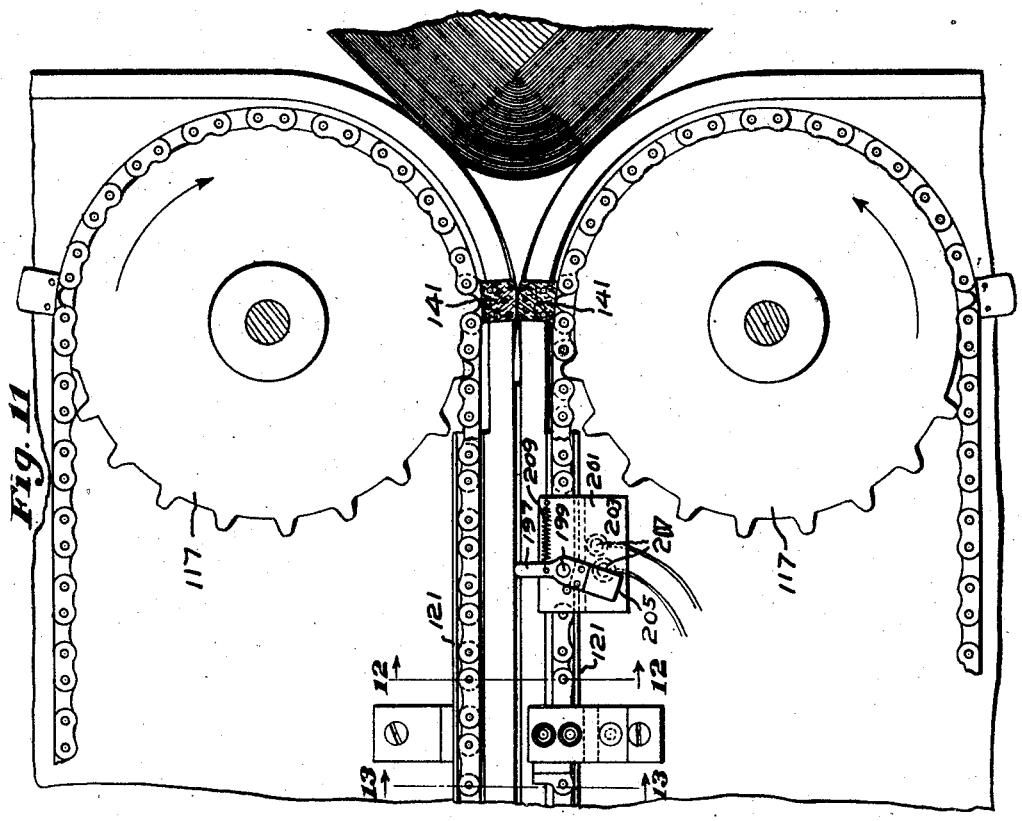
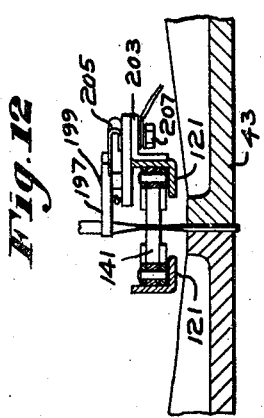
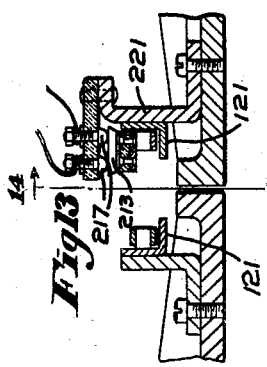
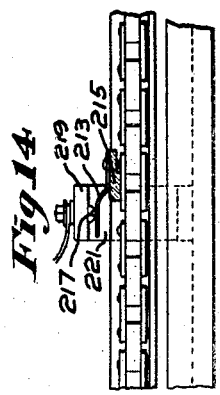

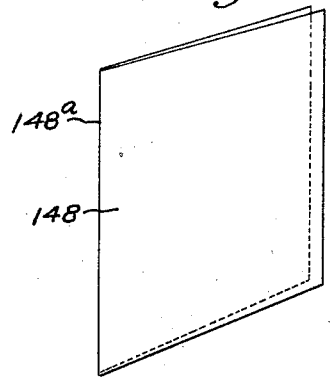
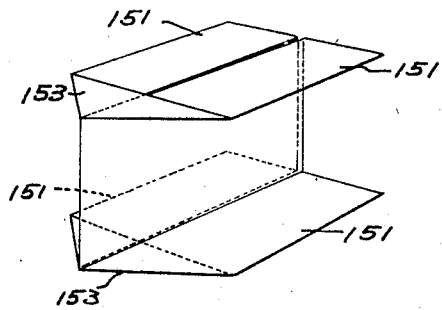
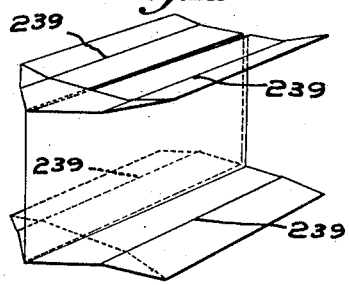
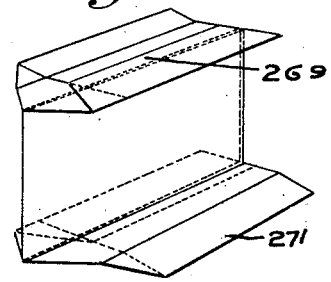
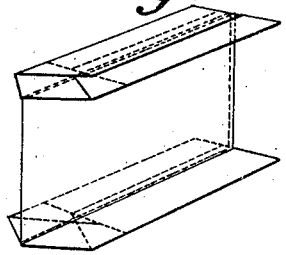
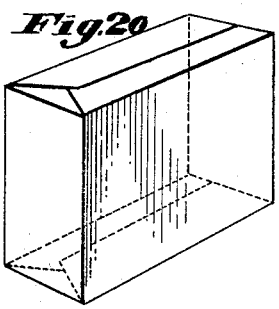

United States Patent Office.

JOE V. R. SHEPHERD, OF HOLLISTON, MASSACHUSETTS, ASSIGNOR TO PAPER PRODUCTS MACHINE COMPANY, OF BOSTON, MASSACHUSETTS, A CORPORATION OF MASSACHUSETTS.

BAG-MAKING MACHINE.

1,365,495.    Specification of Letters Patent.    Patented Jan. 11, 1921.

Application filed March 26, 1920. Serial No. 368,853.

*To all whom it may concern:*

Be it known that I, JOE V. R. SHEPHERD, a citizen of the United States, residing at Holliston, county of Middlesex, and State of Massachusetts, have invented an Improvement in Bag-Making Machines, of which the following description, in connection with the accompanying drawings, is a specification, like characters on the drawings representing like parts.

The invention to be hereinafter described relates to machines for making bags of paper or other suitable material, and more particularly to improvements in the bag making machine disclosed in the application of Charles H. Howard, Serial No. 282,113, filed March 12, 1919.

One of the purposes of the invention is to provide a simple and efficient machine for rapidly making bags. In carrying the invention into practical effect, in the present instance, a bag blank is taken in partially folded condition from a stack or supply of blanks and fed longitudinally through the machine. In the course of its transit, marginal portions of the opposite edges of the blank are folded outwardly transversely to the plane of the body of the blank, and adhesive is applied to triangular end portions adjacent the base of the bag, an adhesive is applied to one of the margins at each edge of the bag longitudinally thereof, the margins are creased or scored longitudinally, a portion of the margin receiving the adhesive is folded over on the scored line to the other portion of the margin, and then the opposite margin is folded over into adhesive engagement with the first folded margin at each edge of the bag.

The character of the invention will be best understood by reference to the following description of one good form of the invention shown in the accompanying drawings, wherein:

Figures 1 and 2 are a plan of the machine;

Fig. 3 on an enlarged scale is a sectional view of one of the scoring devices;

Fig. 4 is a horizontal section taken on line 4—4 of Fig. 10;

Fig. 5 is a plan of one of the electrical switches for the control of one of the adhesive applying devices and showing diagrammatically the electrical wiring and connections therefor;

Figs. 6 and 7 are a side elevation of the machine;

Figure 1:
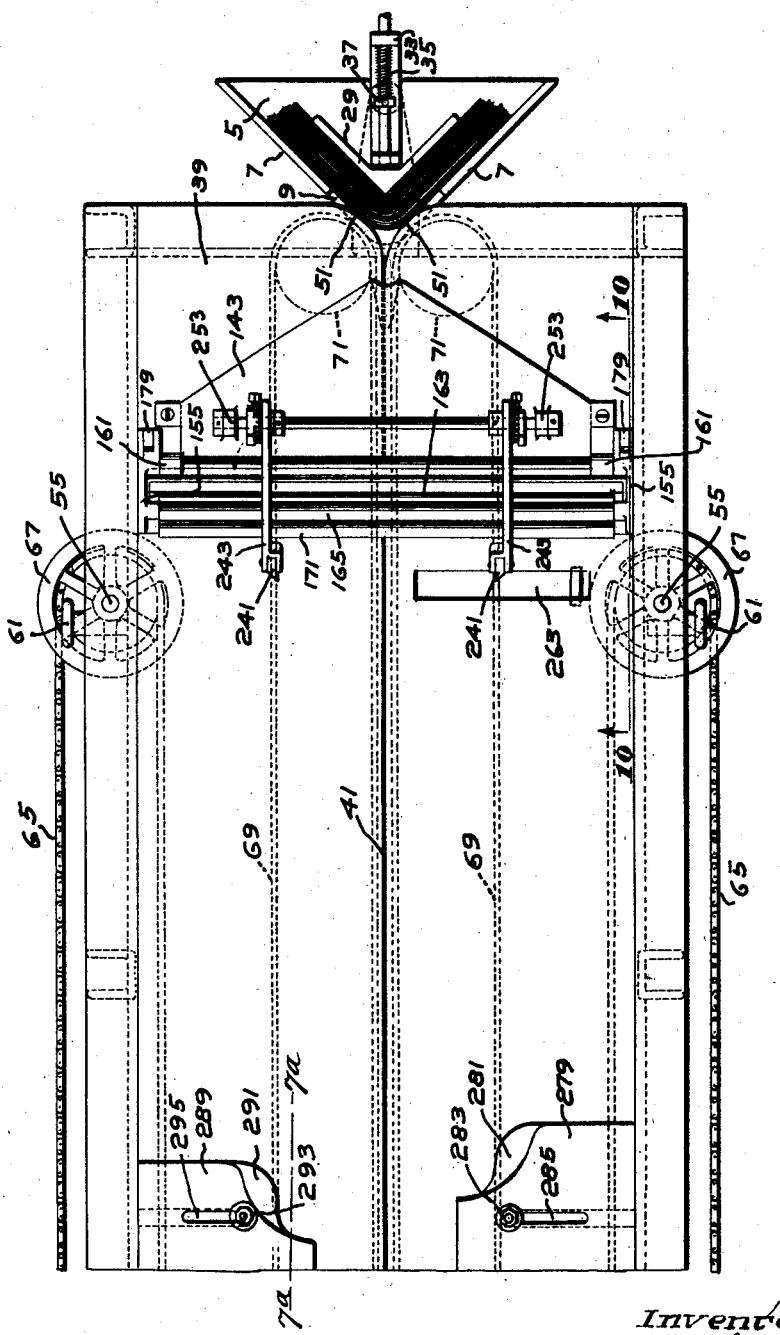

Fig. 7ª is an enlarged detail section on line 7ª—7ª, Fig. 1.

Fig. 8 is a rear end elevation of the machine;

Fig. 9 on an enlarged scale is a vertical transverse section taken on line 9—9 of Fig. 2;

Fig. 10 on an enlarged scale is a vertical, longitudinal section taken on line 10—10 of Fig. 1;

Fig. 11 on an enlarged scale is a horizontal section showing portions of a pair of endless carriers for feeding the bag blanks through the machine;

Fig. 12 is a vertical section taken on line 12—12 of Fig. 11;

Fig. 13 is a vertical section taken on line 13—13 of Fig. 11;

Fig. 14 is a vertical section taken on line 14—14 of Fig. 13; and

Figs. 15 to 20 are view illustrating successive stages in the folding of the bag from a blank.

Referring to the drawings, the machine shown therein as one good form of the invention, may be provided with any suitable frame for supporting the instrumentalities thereof, said frame, in the present instance, comprising side frames 1 connected by suitable transverse members 3.

Suitable means may be provided for supporting a supply of bag blanks at the front or feeding-in end of the machine. This means, in the present instance of the invention, comprises a triangular-shaped table 5 (Figs. 1 and 6) having a pair of upright angularly disposed walls 7 rising therefrom with a delivery space 9 between said walls. To enable adjustment of said table to accommodate bag blanks of various widths, it may be mounted on a bracket 11 adjustably secured on a post 13 by a set screw 15. The post may project downward through a boss 17 and be adjustably secured thereto by a set screw 19. The boss 17 may be formed integral with a plate 21 which may be adjusted toward or from the machine frame on a bracket 23 mounted on the machine frame, and the plate may be secured in different positions of adjustment by a bolt 25 entered through the plate 21 and through an elongated slot 27 in the bracket 23.

The bag blanks may be partially folded transversely to the lengths thereof and mounted on the table with their lower edges resting thereon. To hold the partially folded bag blanks in upright position and maintain the outermost blank in contact with the upright walls 7, in the present instance, a presser or follower 29 (Figs. 1 and 6) may be provided, said follower having sides angularly disposed in positions substantially parallel to the upright walls 7. The follower may be mounted on a bar 31 slidably mounted in the fork 33 mounted on the upper end of the table supporting post 13 referred to. The follower may be urged toward the walls 7 by a coil spring 35 encircling the bar 31 and confined between a collar 37 on said bar and one of the members of the fork 33. The construction is such that the assembly of bag blanks will be held between the upright walls 7 and the follower, with the lower edges of the blanks resting on the table, and as fast as the outermost blank is withdrawn from the table, the assembly of blanks will be advanced a distance equal to the thickness of the blank, so that a blank will always be in readiness to be withdrawn from the table.

Mounted on the side frames are an upper plate 39 having a longitudinal slot 41 therein, and a lower plate 43 having a longitudinal slot 45 therein. The upper plate may have a flange or rim 47 projecting downward therefrom, and the lower plate may have a flange or rim 49 projecting upward therefrom. These rims may have curved portions 51 adjacent the upright walls 7 and preferably projecting into the space between said walls, that the outermost bag blank may be pressed by the follower 29 into engagement therewith.

In order that bags of different sizes may be made by the machine, the upper and lower plates may be relatively adjusted to vary the distance between them. To accomplish this, in the present instance of the invention, the lower plate 43 may be provided with split bosses 53 (Figs. 1, 2, 6 and 7) threaded to four upright shafts 55 mounted on the side frames of the machine, one pair of said shafts being adjacent the front, and the other pair of said shafts being adjacent the rear end of the machine. Rotation of said upright shafts will adjust the lower plate relatively to the upper plate. To secure the plate in its different positions of adjustment along the screw shafts, the split bosses 53 may be provided with screws 57 mounted in sleeves 59 projecting from said bosses transversely thereof, said screws being provided with suitable hand wheels 61. The construction is such that on rotation of these hand wheels the screws 57 will serve to clamp the bosses 53 to the screw shafts 55 or release the same therefrom.

Suitable means may be provided for rotating the screw shafts 55. To accomplish this, in the present instance, the screw shafts at each side of the machine are provided with sprocket wheels 63 fast thereon connected by sprocket chains 65 and one pair of the screw shafts, in the present instance, the pair adjacent the front end of the machine, may be provided with hand wheels 67. On release of the securing devices for the bosses 53, the hand wheels may be rotated, thereby to rotate the screw shafts to adjust the lower plate as desired.

The present invention contemplates that the bag blanks shall be progressively fed from their source of supply at the front end of the machine through the slots 41 and 45 in the upper and lower plates, and the relative adjustment of said plates should be such that the margins of the bag blank shall project substantial distances above and beneath the upper and lower plates, respectively. Suitable means may be provided for taking the outermost bag blank from a source of supply and for feeding the same through said slots longitudinally of the machine. This means, in the present instance, comprises a pair of upper carriers in the form of sprocket chains 69 (Figs. 1 and 2) connecting a pair of sprocket wheels 71 adjacent the front end of the machine with a pair of sprocket wheels 73 adjacent the rear end of the machine. Said sprocket chains may be guided and supported in the course of their inner runs by tracks conveniently in the form of angle bars 75 (Fig. 9) secured to and depending from the top plate 39. The sprocket wheels 71 and 73 may be journaled on stud shafts 77 secured to and depending from the top plate.

Suitable means may be provided for driving said sprocket wheels and chains. In the present instance, this is accomplished by driving mechanism for the sprocket wheels 73 at the rear end of the machine. This driving mechanism comprises hubs 79 on the sprocket wheels 73 having bevel pinions 81 meshing with beveled gears 83 fast on short shafts 85 journaled in bearings in brackets 87 depending from the top plate. Also, fast on the shafts 85 are bevel pinions 89 meshing with bevel pinions 91 on the upper ends of vertical shafts 93. To drive the vertical shafts 93, they may have bevel pinions 95 fast thereon adjacent the lower ends thereof meshing with bevel pinions 97 fast on a cross shaft 99 extending transversely of the machine and journaled in bearings in brackets 101 (Figs. 8 and 9) mounted on one of the transverse bars 3 of the machine frame. To rotate the shaft 99, a bevel pinion 103 may be mounted fast on the shaft 99 and mesh with a bevel pinion 105 on a stud shaft 107 journaled in a bearing in a bracket 109 mounted on the transverse frame bar 3. A pulley 111 on the stud shaft 107 Fig. 7 may be driven by a belt 113 from any suitable source of power.

It will be noted that the carriers 69 are located closely adjacent to and beneath the upper plate 39, and therefore, will engage the bag blanks adjacent said plate. It is also desirable that carriers shall be provided to engage the bag blanks adjacent the lower plate 43. To accomplish this, in the present instance, a pair of carriers may be provided, conveniently in the form of sprocket chains 115 connecting sprocket wheels 117 adjacent the front end of the machine with sprocket wheels 119 (Fig. 9) adjacent the rear end of the machine. The inner runs of said sprocket chains may be guided by tracks conveniently in the form of angle bars 121 mounted on brackets 123 secured to the upper sides of the lower plate 43. The lower sprocket wheels 117 and 119 may be journaled on stud shafts 125 mounted on and rising from the lower plate 43.

Suitable means may be provided for driving the lower carriers. To accomplish this, in the present instance, the sprocket wheels 119 may be provided with hubs 127 having bevel gears 129 fast thereon meshing with bevel pinions 131 fast on short shafts 133 journaled in bearings in brackets 135 mounted on the lower plate. Also fast on the shafts 133 are bevel pinions 137 meshing with bevel pinions 139 splined to the upright shafts 93 referred to, that the bevel pinions 139 may be driven from said upright shafts in the various positions of vertical adjustment of the lower plate 43. It will be noted that the lower carriers through the mechanism described, are driven from the same source of power as the upper carriers, and that the upper and lower carriers are driven at the same speed.

The carriers or sprocket chains may be provided with suitable means at intervals in the lengths thereof for gripping or engaging the bag blanks in order to feed the same from their source of supply through the slots in the upper and lower plates. This means, in the present instance, is in the form of pads or feet 141 (Fig. 11) of rubber or other suitable material carried by the sprocket chains. In the present instance, these pads are arranged in groups of three adjacent each other, and the groups may be located on the chains at intervals corresponding to the lengths of the bag blanks, in order that the bag blanks may be progressively gripped by said pads and fed from their source of supply through the machine.

As the bag blanks stand on their supply table, as stated, they are partially folded, but when the outermost blank is engaged by the pads, it will be pulled or withdrawn from the assembly of blanks and fed along the curved rims 51 of the table which converge toward the slots of the plates. As a consequence, the bag blank on entering said slots will be folded along a line transversely to the lengths of the blank substantially as indicated in Fig. 15. It will be noted that the pads engage the blank a substantial distance back from said transverse line of the blank, and therefore, they will not sharply fold or crease the blank so as to weaken the same.

The present invention contemplates that after the blank has been introduced between the slots of the plates, the marginal portions at the opposite edges of the blank shall be folded over against the upper and lower surfaces of the upper and lower plates substantially as shown in Fig. 16. To accomplish this, in the present instance, folding plates 143 (Figs. 1 and 6) may be provided above and beneath the upper and lower plates 39 and 43 adjacent the feeding in end of the machine. These plates may have receiving portions 145 curving or flaring outwardly and provided with central longitudinal grooves 147. The construction is such that when a bag blank 148 (Fig. 15) is fed from the supply table into the slots in the plates, the advancing edge 148ª or fold of the blank projecting outward beyond the slotted plates will be moved into engagement with the flaring portions 145 of the folding plates, and the marginal portions 151 (Fig. 16) will be spread out and folded over against the outer faces of the slotted plates. The fold of the blank in the course of this operation will engage the longitudinal grooves 147, which will desirably serve to center the portions of the blank projecting outward beyond the slotted plates, and insure equal folding of the marginal portions 151.

The present invention contemplates that after the marginal portions of the blank have been folded outwardly against the slotted plates, adhesive shall be applied along the upper margins of the triangular portions 153 (Fig. 16) adjacent the bottom of the blank. To accomplish this, in the present instance of the invention, adhesive supplying devices are provided above and beneath the slotted plates. The device above the upper plate comprises a trough 155 (Fig. 10) carried by arms 157 fast on a rock shaft 159 mounted in bearings in brackets 161 (Fig. 1) mounted on the upper plate, said trough being of a length substantially equal to the width of the upper plate. Mounted in the trough 155 is a feed roller 163 adapted to deliver the adhesive to a doctor roller 165 having trunnions 167 mounted in open bearings in arms 169 projecting outward beyond the trough 155. An adhesive applying roller 171 is mounted in the outer ends of the arms 169. The roller 171 normally is held up somewhat from the upper plate by coil springs 173 having ends connected to lugs 175 depending from the upper plate and having opposite ends connected to a pair of arms 177 fast on the trough carrying rock shaft 159.

Suitable means may be provided for moving the adhesive applying roller 171 downward at the proper time to apply adhesive to the triangular portions 153 of the bag blank. This means, in the present instance, comprises a pair of connecting rods 179 having their upper ends connected to the arms 177 and their lower ends adjustably connected by bolts 181 to arms 183 fast on a rock shaft 185 journaled in bearings in brackets 187 secured to and depending from the lower slotted plate. An arm 189 is connected to the rock shaft 185 and to the core 191 of a solenoid 193 mounted on the lower slotted plate. The construction is such that when the solenoid is energized through the connections to be described, the adhesive applying roller 171 will be moved downward to apply adhesive to the upper triangular portion 153 of the bag blank, and when the solenoid is deënergized, the coil springs 173 will become effective to lift the adhesive applying roller up to its position shown in Fig. 10.

To energize the solenoid, the coil thereof may receive electric current from a battery 195 or other suitable source of electricity, and the electric circuit for the solenoid may have a pair of switches therein, one adapted to be closed by movement of the bag blank, and the other being adapted to be closed by the travel of one of the carriers. The switch controlled by the bag blank, in the present instance, comprises a lever 197 (Figs. 5 and 12) fulcrumed intermediate its ends on a pin 199 connected to an insulation plate 201 carried by a bracket 203 secured to one of the angle guide tracks for the carrier. A reversely curved bridge contact 205 is connected to one end of the lever 197 and is adapted to engage a pair of fixed contacts 207 mounted on the insulation plate 201 when the lever 197 is moved to its position shown in dotted lines in Fig. 5. The lever 197 is normally held in its position shown in full lines in Fig. 5 by a coil spring 209 having one end anchored to the insulation plate, and its opposite end connected to said lever. Movement of the lever under the influence of said spring is limited by a stop 211. The lever 197 projects over the slot in the lower plate, and as a consequence, when the bag blank is fed through said slot, the leading edge thereof will engage the lever 197 and will rock the same from its position shown in full lines to its position shown in dotted lines in Fig. 5, and said switch will remain in this position so long as the bag blank is moving past the same. After the bag blank has passed said switch, the coil spring 209 will become effective to swing said lever to its open position shown in full lines in Fig. 5. Thus, by means of this switch, the solenoid circuit cannot be completed if a bag blank is not passing said switch.

The other switch in the circuit of the solenoid comprises a leaf spring bridge contact 213 (Figs. 13 and 14) mounted on an insulation piece 215 secured to one of the carrier sprocket chains. A series of such switches may be provided at appropriate intervals along the length of the sprocket chain according to the number of blanks to be fed in one complete orbital movement of said chain. Adjacent the first switch described, a pair of fixed contacts 217 (Fig. 11) may be mounted in an insulation plate 219 mounted on a bracket 221 on the upper slotted blank.

The battery 195 referred to, may be connected by a conductor 223 (Fig. 5) with one of the fixed contacts 207. The other fixed contact 207 may be connected by the conductor 225 with the solenoid 193. Said solenoid may be connected by a conductor 227 with the fixed contact 217, and the other fixed contact may be connected by a conductor 229 with the battery. The construction is such that when a bag blank is fed through the plate slots in the course of the transit thereof, it will engage the switch lever 197, thereby connecting the bridge contact 205 with the fixed contacts 207, and said bridge contact will continue to bridge the fixed contacts 207 so long as the bag blank is moving past the switch lever 197. The switch 213 is so located on the sprocket chain that when the bag blank has advanced sufficiently to bring the upper edge of the triangular portion 153 beneath the adhesive applying roller 171, the switch 213 will connect the fixed contacts 217, thereby completing the circuit to the solenoid which will operate through the connections described, to bring the adhesive applying roller 171 down against the triangular portion 153 of the blank, thereby to apply adhesive thereto. Said roller will remain merely momentarily in contact with the blank, and only so long as the switch 213 is wiping past the fixed contacts 217.

It is also desirable to apply adhesive to the upper edge of the triangular portion 153 at the opposite side of the bag blank. To accomplish this, in the present instance, a trough 231 (Fig. 10) extending beneath and transversely of the lower slotted plate, may be mounted on arms 233 fast on the rock shaft 185 referred to. An adhesive applying roller 235 may have trunnions mounted in open bearings 237 in said trough. The construction is such that when the upper adhesive applying roller 171 is moved downward, the lower adhesive applying roller 225 will be moved upward, and as a consequence, adhesive will be applied simultaneously to both of the triangular portions 153 of the blank in the form of a ribbon adjacent the upper edges of said portions.

As stated, the present invention contemplates that bags of different sizes may be made on the same machine. With different sized bags the triangular portions 153 of the blank will vary in area, and therefore, will require ribbons of adhesive of varying length. Rollers of different lengths such as the doctor roller 165 may be used to transfer adhesive from the trough roller 163 to the adhesive applying roller 171, and adhesive applying rollers such as 235 of different lengths may be used as required.

It is desirable that the margins of the blank shall be scored or creased along lines 239 (Fig. 17) intermediate the edges of said margins to facilitate folding of said margins, as more fully hereinafter described. To accomplish this, in the present instance of the invention, scoring wheels 241 (Figs. 1, 3, 6 and 10) may be provided, a pair for coöperation with the upper plate, and a pair for coöperation with the lower plate. These scoring wheels are mounted in forks in the ends of arms 243 having hubs 245 (Figs. 3 and 4) loosely mounted on reduced ends of sleeves 247 secured by set screws 249 to shafts 251 fast in brackets 253 mounted on the upper and lower plates. Arms 255 projecting from the sleeves 247 are connected by coil springs 257 with spurs 259 projecting from the levers 243.

The construction is such that the coil springs tend to press the scoring wheels toward the upper and lower plates so as to score the margins of the bag along the lines 239 (Fig. 17) as the bag blank is fed by the carriers through the slots of the upper and lower plates. To enable blanks of varying widths to be scored or creased as described, the sleeves 247 carrying the arms 243 may be readily adjusted in the direction of the axes of the shafts 251 on release of the set screws 249. When the scoring wheels have been adjusted to their proper positions, the set screws may be tightened to hold the sleeves 247 in their positions of adjustment, and then the scoring wheels may operate as before.

It is desirable to apply adhesive to one margin of each pair of margins at opposite edges of the bag, in order that when said margins are folded over into superposed relation, as hereinafter described, they shall be secured together. To accomplish this, in the present instance, a trough 261 (Fig. 10) may be secured to the under side of the upper plate and may communicate with an elongated opening 263 (Fig. 1) in the upper plate. Mounted in said trough is an adhesive applying roller 265 having trunnions journaled in open bearings 267 in the ends of said trough. This roller 265 may project somewhat above the upper surface of the upper plate, and may be of a width to apply a ribbon of adhesive 269 (Fig. 18) to one of the margins 239 as the bag blank is advanced through the slots in the upper and lower plates.

To apply a ribbon of adhesive 271 to one margin of the other pair of margins of the blank, a trough 273 (Fig. 10) may be secured to the under side of the lower plate, and a roller 275 may be mounted in said trough and have trunnions journaled in open bearings 277 in the ends of said trough. The roller 275 is directly beneath the under surface of the lower plate in proper position to apply the ribbon of adhesive 271 to one of the margins of the blank in the course of the feed of the latter through the machine.

The present invention contemplates that after the adhesive ribbons 269 and 271 have been applied to one of the margins of each pair of margins as described, the margins shall be folded on the scoring lines 239 into overlapped relation. The margin having the adhesive ribbons 269 and 271 should be first folded, and then the other margins should be folded over onto the adhesive margins, as indicated in Fig. 19. To accomplish this, in the present instance, folding plates 279 (Figs. 1, 6 and 7ª) may be mounted on the upper and lower plates adjacent one side thereof, and may have portions 281 having a propeller-like curvature such that the outer edges of the adhesive margins will be turned inward and over from their positions shown in Fig. 17 to their positions shown in Fig. 18 along the scoring lines 239. As the bag blank is further advanced, the margins thus folded will be pressed inward in flat condition. In order that the folding plates 279 may be used for folding margins of blanks of different sizes, the folding plates may be adjustably secured to the upper and lower plates by bolts 283 entered through elongated slots 285 in said folding plates, and entered through holes in the upper and lower plates. On release of these bolts, the folding plates may be adjusted transversely of the machine, and to insure adjustment in a right line, the rear edges of said folding plates may engage transverse guide bars 287 (Fig. 2) mounted on the upper and lower plates.

To fold the plain or non-adhesive margins over against the adhesive margins, folding plates 289 (Figs. 1 and 6) may be mounted on the upper and lower plates and have portions 291 with a propeller-like curvature such that on engagement of the outer edges of the plain margins therewith, said margins will be folded over along their scoring lines and inward into adhesive engagement with the first folded margins, as indicated in Fig. 19. In order that margins of blanks of different sizes may be folded, the folding plates 289 may be adjustably secured to the upper and lower plates by bolts 293 entered through elongated slots 295 in said folding plates and through holes in the upper and lower plates. In order that these folding plates 289 may have a right line adjustment, their rear edges may engage and slide along the guide bars 287 referred to.

After the bag blank has passed the folding plates 279 and 289, it is completed, and it may be carried thence by the carriers through the slots in the upper and lower plates and delivered therefrom at the rear end of the machine.

It is believed that the operation of the machine will be readily understood from the foregoing description without further elucidation thereof.

By the invention described, bag blanks may be rapidly folded, and marginal portions thereof secured in adhesive engagement with few and simple operations resulting in the production of a perfect product. The machine is strong, simple and reliable in operation, not liable to get out of order, and requires little attention on the part of the operator.

It will be understood that the invention is not limited to the specific embodiment shown, and that various deviations may be made therefrom, without departing from the spirit and scope of the appended claims.

What is claimed is:—

1. A bag making machine, comprising, in combination, means to support an assembly of bag blanks in partially folded condition, a pair of tables having longitudinal slots therein, pairs of endless carriers located between said tables and having feet for gripping the blanks successively and feeding the same through said longitudinal slots, folding plates at the outer sides of said tables for folding the margins of the opposite edges of the blank outward against the outer faces of said tables, means to score the margins longitudinally, means to apply adhesive to one of the margins at each edge and crosswise of the end portions adjacent said margins, and folding plates at the outer sides of the tables for folding over the margins at each edge of the bag into adhesive engagement.

2. A bag making machine, comprising, in combination, means to support an assembly of bag blanks in partially folded condition, a pair of spaced plates having longitudinal slots therein, means for feeding a blank from said blank support means through the slots in said plates, folding plates adjacent said slotted plates for engaging the advancing folded edge of a bag blank and for folding marginal portions of the blank outward against said plates, means for applying adhesive to the blank transversely thereof and adjacent the advancing fold thereof, means to score the margins of the blank longitudinally thereof, means to apply adhesive to one of each pair of margins at opposite edges of the bag, and means for folding over one of the margins of each pair into adhesive engagement with the other margin thereof.

3. A bag making machine, comprising, in combination, means to support an assembly of bag blanks in partially folded condition, a pair of slotted plates, means automatically to engage and progressively feed the blanks from said supporting means through the slots in said plates, and folding plates opposed to said slotted plates for folding margins of the blanks outward against said plates as they are fed through the slots in the latter.

4. A bag making machine, comprising, in combination, means to support an assembly of bag blanks in partially folded condition, a pair of spaced plates having slots therein, means for automatically feeding the blanks from said supporting means through the slots in said plates, means for folding margins of the blanks outward against said plates as they are fed through said slots, means for applying adhesive to certain of the margins as they are fed along said plates, and means for folding the margins at opposite sides of the bag over into adhesive engagement.

5. A bag making machine, comprising, in combination, means to support an assembly of bag blanks in partially folded condition, a pair of plates having slots therein, endless carriers for feeding the bag blanks progressively from said supporting means through said slots, folding plates opposed to said slotted plates, for folding marginal portions of the blanks outwardly against said plates, means for scoring said margins longitudinally thereof, and folding plates for folding said margins along their scored lines into overlapped relation.

6. A bag making machine, comprising, in combination, means to support an assembly of bag blanks in partially folded condition, a pair of slotted plates spaced to determine the width of the bag, means for feeding the blanks progressively from said support means through the slots in said plates with marginal portions of the blanks projecting outward beyond said plates, folding plates opposed to said slotted plates for engaging the advancing edges of the blanks and folding said outwardly projecting margins against said slotted plates, and means for folding the margins at opposite sides of the bag into overlapped relation.

7. A bag making machine, comprising, in combination, a pair of spaced plates having slots therein, means relatively to adjust said plates in accordance with bags of different widths, means to feed bag blanks through the slots in said plates with margins thereof projecting beyond said plates, means to engage the outwardly projecting margins and fold the same over against said plates, and means to fold the margins at opposite sides of the bag into overlapped relation as they are fed along said plates.

8. A bag making machine, comprising, in combination, a pair of spaced plates having longitudinal slots therein, endless carriers for gripping bag blanks and feeding the same progressively through said slots, means relatively to adjust said plates and carriers to conform to bags of different sizes, means to fold margins of the blanks projecting outward beyond said plates over against said plates, and means to fold the margins at opposite sides of the bag into overlapped relation.

9. A bag making machine, comprising, in combination, a pair of spaced plates having slots therein, means including screw shafts relatively to adjust said plates to conform to bags of different sizes, means to feed bag blanks progressively through the slots in said plates with the margins of the blanks projecting outwardly beyond said plates, folding plates for engaging portions of the advancing edges of the blanks projecting outward beyond said plates to fold the margins over against said plates, means to apply adhesive to one of the margins at each side of the bag, and means for folding the margins at the opposite sides of the bag into overlapping adhesive engagement.

10. A bag making machine, comprising, in combination, a pair of spaced plates having slots therein, means relatively to adjust said plates to conform to bags of different widths, means to support an assembly of bag blanks adjacent ends of said slots, means to adjust said blank support means so that margins of the blanks will project beyond said plates, means to feed the blanks progressively from said support means through the slots in said plates, means for folding the margins of the blanks outwardly against said plates as the blanks are fed through said slots, and means for folding the margins at opposite sides of the bag into overlapped relation as the blanks are fed further through said slots.

11. A bag making machine, comprising, in combination, a support for bag blanks having a delivery opening, means to press the bag blanks progressively toward said opening, a pair of spaced plates having slots therein leading from said opening, means for feeding the blanks progressively from the opening in said support through said slots with margins of the blanks projecting beyond said plates, means for folding the margins outward against said plates, means for applying adhesive to certain of the margins, and means for folding the margins into overlapped relation.

12. A bag making machine, comprising, in combination, a pair of spaced plates having slots therein, means for feeding bag blanks progressively through said slots with margins of the blanks projecting outward beyond said slots, means for folding the margins over against said plates as they are fed through said slots, and electrically actuated means for applying adhesive to end portions of the blanks adjacent said margins in the course of the transit of the blanks through the slots in said plates.

13. A bag making machine, comprising, in combination, a pair of spaced plates having slots therein, means for feeding bag blanks through said slots with margins of the blanks projecting outward beyond said plates, means for folding margins of the blanks outward against said plates, adhesive supply means, rollers for receiving adhesive from said supply means and extending transversely of said slots, and means for moving said rollers automatically in contact with the blanks as the blanks are fed through said slots.

14. A bag making machine, comprising, in combination, means to support an assembly of bag blanks in partially folded condition, means for feeding the blanks progressively from said support means, means to guide the body portions of the blanks as they are fed while leaving marginal portions thereof free, means for folding the marginal portions at opposite sides of the bag away from each other, means for applying adhesive to certain of said marginal portions, and means for folding said marginal portions into overlapped relation.

15. A bag making machine, comprising, in combination, a pair of spaced plates having slots therein, means for feeding bag blanks progressively through said slots with margins of the blanks projecting outward beyond said plates, and means to apply adhesive to portions of said blanks including electrical means to prevent operation of said adhesive applying means if a blank is not fed through said slots.

16. A bag making machine, comprising, in combination, a pair of plates having slots therein, means for feeding a bag blank through said slots with margins of the blanks projecting beyond said plates, means to apply adhesive to portions of said blanks including electrical control means therefor having a switch operated by the blank in the course of its travel through said slots.

17. A bag making machine, comprising, in combination, a pair of spaced plates having slots therein, means for feeding bag blanks progressively through said slots, means to fold margins of said blanks over against said plates, means to apply adhesive to portions of said blanks, and electrical means for controlling said adhesive applying means including a switch operable by said feed means and a switch operable by said blank.

18. A bag making machine, comprising, in combination, a pair of spaced plates having slots therein, means for feeding bag blanks progressively through said slots with margins of the blanks projecting beyond said plates, means for folding said margins over against said plates, means for applying adhesive to portions of said blanks as they are fed along said plates including an electrical controlling device having a circuit, a switch for said circuit operable by said feed means, a switch in said circuit operated by the bag blank, and means automatically to open the latter switch to prevent operation of the adhesive applying means when a bag blank is not moving through said slots past said switch.

19. A bag making machine, comprising, in combination, a pair of plates having slots therein, means to feed bag blanks progressively through said slots, means relatively to adjust said plates to conform to bags of different sizes, means to fold margins of the blanks outward against said plates, means for scoring said margins longitudinally thereof, means to adjust the scoring means to conform to bags of different sizes, means to fold said margins along said scoring lines, and means to adjust the latter folding means to conform to bags of different sizes.

20. In a device of the class described, in combination, means to support an assembly of bag blanks in partially-folded condition, and means for simultaneously drawing the blanks from the support and folding the same, including traveling means for engaging the outermost bag blank upon opposite sides of its partially-formed fold and completing the fold by forcing the sides of the blank toward each other as the blank is drawn from the support.

21. In a device of the class described, in combination, means to support an assembly of bag blanks in partially-folded condition, and bag-engaging means for simultaneously drawing the blanks from the support and folding the same, including opposed endless conveyers constructed and arranged to engage the outermost bag blank upon the opposite sides of its partially-formed fold and complete the fold by forcing the sides of the blank toward each other as the blank is drawn from the support.

22. A bag-making machine, comprising, in combination, means to support an assembly of bag blanks in partially-folded condition, a pair of spaced slotted plates, folding plates supported in fixed relation to said slotted plates, and means for drawing the blanks from the support and simultaneously folding them, comprising opposed endless conveyers constructed and arranged to engage the outermost blank upon opposite sides of its partially-formed fold and draw the same between the conveyers, said conveyers operable to successively feed the folded blanks into said slots and to fold the marginal portions of the blanks by forcing the same against said fixed folding plates.

23. A bag-making machine, comprising, in combination, means to support an assembly of bag blanks in partially-folded condition, means for drawing the blanks from the support and simultaneously folding them, including opposed endless conveyers constructed and arranged to engage the outermost blank upon opposite sides of its partially-formed fold and draw the same between the conveyers, and means operating upon the blank carried by the conveyers to further fold the blank.

In testimony whereof I have signed my name to this specification.

JOE V. R. SHEPHERD.